US011250026B2

(12) United States Patent
Kumar et al.

(10) Patent No.: US 11,250,026 B2
(45) Date of Patent: Feb. 15, 2022

(54) REPLICATING DATA ACROSS DEPLOYMENTS IN A ROUTING CONSTRAINED ENVIRONMENT

(71) Applicant: Intuit Inc., Mountain View, CA (US)

(72) Inventors: Rohit Kumar, Bangalore (IN); Namita Devadas, Bangalore (IN); Anil Sharma, Bangalore (IN); Divakar Ungatla, Bangalore (IN); Govinda Sambamurthy, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/804,079

(22) Filed: Feb. 28, 2020

(65) Prior Publication Data

US 2021/0271692 A1  Sep. 2, 2021

(51) Int. Cl.
*G06F 9/44* (2018.01)
*G06F 16/27* (2019.01)
(Continued)

(52) U.S. Cl.
CPC .......... *G06F 16/275* (2019.01); *G06F 11/302* (2013.01); *G06F 11/3414* (2013.01);
(Continued)

(58) Field of Classification Search
CPC .. G06F 16/275; G06F 11/302; G06F 11/3414; G06F 11/3664; G06F 11/3688; G06F 11/3692
See application file for complete search history.

(56) References Cited

U.S. PATENT DOCUMENTS 6,324,654 B1 * 11/2001 Wahl ................... G06F 11/2066
707/999.202
6,920,555 B1 * 7/2005 Peters ................... G06F 9/4451
711/173
(Continued)

OTHER PUBLICATIONS

International Search Report dated Dec. 10, 2020 issued in International Application No. PCT/US2020/040400.
(Continued)

*Primary Examiner* — Hang Pan
(74) *Attorney, Agent, or Firm* — DLA Piper LLP (US)

(57) ABSTRACT

Disclosed herein are systems and methods for replicating data across deployments in a routing constrained environment. To replicate data, a processor may detect a modification that changes data for a source entity within a source environment hosting a source deployment of an application. The processor may then update a target environment hosting a target deployment of the application to mirror the modification within the source environment. To update the target environment, the processor may generate a mapping artifact that identifies the source entity having changed data and the target entity within the target environment receiving the changed data. The processor may then create a mapping infrastructure including one or more compute instances that replicate the changed data for the source entity in the target entity. To replicate data, the one or more compute instances may execute a mapping script that replicates the changed data from the source entity in the target entity by copying changed data from the source environment and writing it to a database in the target environment.

20 Claims, 6 Drawing Sheets

(51) Int. Cl.
*G06F 11/30* (2006.01)
*G06F 11/34* (2006.01)
*G06F 11/36* (2006.01)

(52) U.S. Cl.
CPC ...... *G06F 11/3664* (2013.01); *G06F 11/3688* (2013.01); *G06F 11/3692* (2013.01)

(56) References Cited

U.S. PATENT DOCUMENTS

| | | | |
|---|---|---|---|
| 2003/0182325 A1* | 9/2003 | Manley | G06F 11/2074 |
| 2005/0149582 A1* | 7/2005 | Wissmann | G06F 16/275 |
| 2006/0161746 A1* | 7/2006 | Wong | H04L 67/1097 |
| | | | 711/162 |
| 2012/0110574 A1* | 5/2012 | Kumar | G06F 9/45558 |
| | | | 718/1 |
| 2012/0317078 A1* | 12/2012 | Zhou | G06F 16/27 |
| | | | 707/634 |
| 2013/0268920 A1* | 10/2013 | Ursal | G06F 8/70 |
| | | | 717/131 |
| 2016/0337450 A1* | 11/2016 | Anantharam | G06F 9/45533 |
| 2016/0371155 A1 | 12/2016 | Merriman | |
| 2016/0371156 A1 | 12/2016 | Merriman | |
| 2018/0285383 A1 | 10/2018 | Nara et al. | |
| 2018/0300203 A1 | 10/2018 | Kathpal et al. | |
| 2020/0034258 A1 | 1/2020 | Avraham et al. | |

OTHER PUBLICATIONS

Written Opinion dated Dec. 10, 2020 issued in International Application No. PCT/US2020/040400.

\* cited by examiner

REPLICATING DATA ACROSS DEPLOYMENTS IN A ROUTING CONSTRAINED ENVIRONMENT

BACKGROUND OF THE DISCLOSURE

Figure 1:
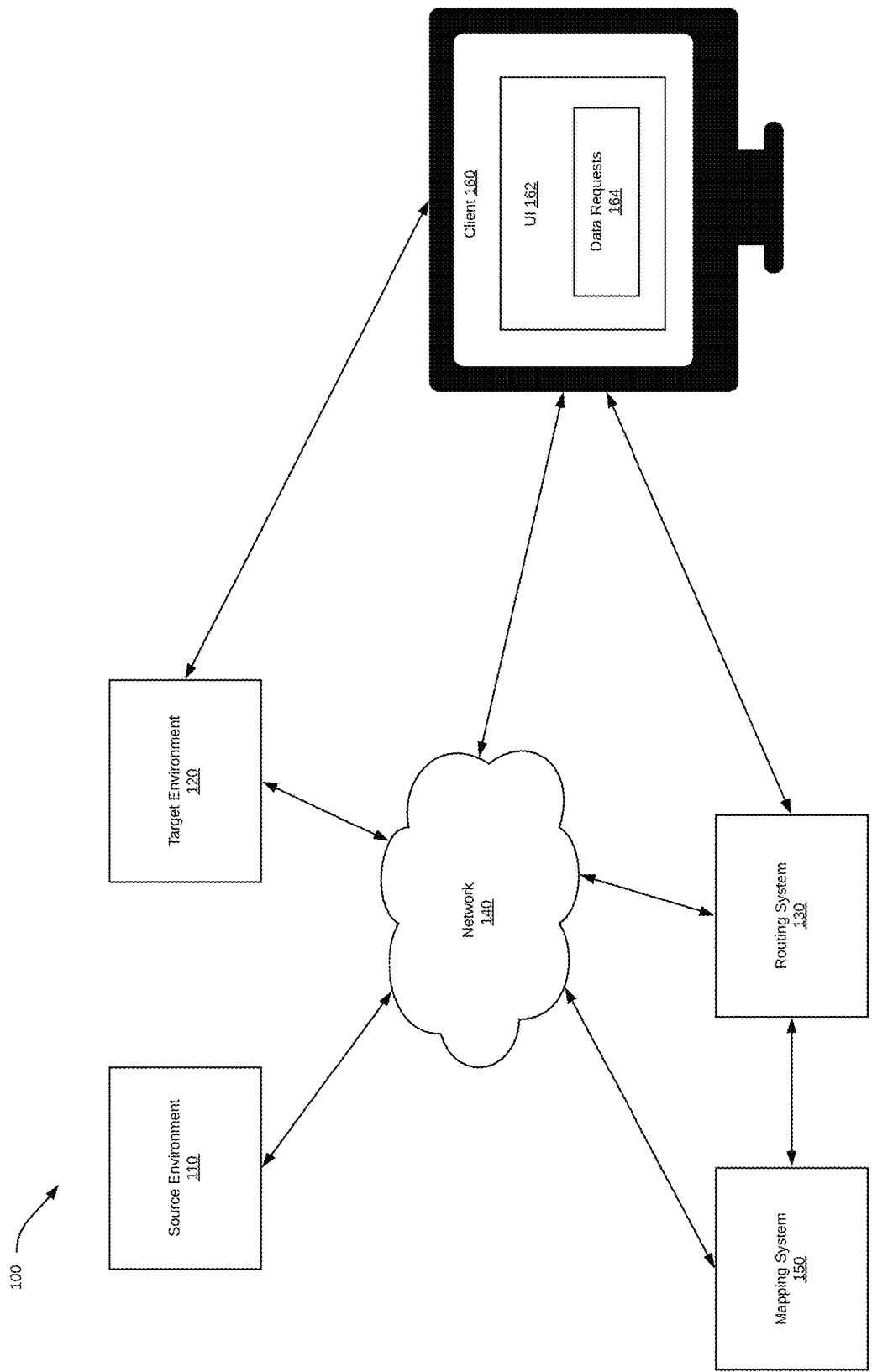
FIG. 1 shows an exemplary system for replicating data across deployments in a routing constrained environment according to various embodiments of the present disclosure.

High traffic websites and/or web applications generally require a sophisticated backend database architecture to operate. For example, a partitioned or shard environment may be used to process a high volume of requests from a large number of clients. A shard environment may distribute data across multiple shards. Each shard may include its own cluster comprising a database server and/or application server and shards may be placed on shared or separate hardware. Shard environments may improve web application performance by balancing loads across multiple clusters, physically locating data closer to callers, reducing table and/or index size, and the like. Shard environments may also enhance security and site reliability by, for example, persisting redundant copies of data, distributing data across separate hardware, hosting data on systems having various independent authentication mechanisms, and the like.

Sometimes it may be desirable maintain multiple deployments of an application. For example, different deployments of an in-production application may serve data requests from users in different countries. Regulations, market demands, and other business reasons may mandate that different application deployments are used to serve customers in, for example, China and the US. Different deployments may also be maintained to serve different user types. For example, one deployment for serving paying users and one deployment for serving non-paying users. Users with admin permissions may also use a deployment that differs from the application deployment used by non-admin users.

Multiple application deployments may also be desirable in pre-production. Before new features, updates, modifications, and the like can be rolled out to websites and/or web applications, they must be extensively tested. Testing ensures that the new aspects work as intended and are interoperable with the existing aspects of the website. The performance and security of the website after the new aspects are incorporated may also be evaluated to maintain a consistent user experience, minimize site downtime, avoid security compromises, sure up any new vulnerabilities, and the like. To facilitate testing new aspects, multiple instances of the web application are deployed across multiple environments, for example, a development environment, a testing environment, a performance environment, a staging environment, and the like. After the new aspects of the application are satisfactorily tested, the updated application may be deployed in a publicly available production environment.

DETAILED DESCRIPTION OF SEVERAL EMBODIMENTS

Disclosed herein are systems and methods for automating data replication across deployments. The deployments may be hosted in different environments (e.g., multiple production environments, a pre-production environment and a production environment, and the like) that require the same data. For example, the data in a pre-production environment must mirror the data in a production environment to ensure accurate testing of new features before they are deployed. Data in multiple production environments must be the same to provide a consistent user experience. To ensure identical data across multiple environments, every time data is updated in a production source environment, the updated data must be mapped to a target environment. Tracking new data updates and mapping updated data from a source environment is a tedious and time consuming manual process. The disclosed systems and methods speed up the data mapping process and increase the similarity of data across multiple deployments by automating the process of replicating data across multiple environments.

The disclosed systems and methods automatically detect a modification within a source environment hosting a source deployment of an application. Once the modification is detected, the target environment hosting a target deployment of the application is automatically updated to mirror the modification within the source environment. The disclosure describes an improvement to incremental backup methods that allows the disclosed data mapping system to automatically replicate data across multiple deployments in a routing constrained environment. As disclosed herein, the term "routing constrained environment" may refer to an environment wherein a request is served with the constraint that needs to be routed to a particular cluster or shard in order for the request to be fulfilled and data returned. The particular cluster or shard that should receive the request may be defined in a cluster identifier that is processed by a dispatcher service.

To facilitate mapping in a routing constrained environment, a mapping artifact may be generated. The mapping artifact may identify each entity in the source environment having changed data and the corresponding target entity receiving the changed data. The mapping artifact may also include route information that identifies the cluster including the target entity and the cluster including the source entity. Once the routing between the source environment and the target environment is defined in the mapping artifact, an autonomous function may automatically create a mapping infrastructure that replicates the changed data for the source entity in the target entity.

To promote efficiency and reduce the amount of system down time, the mapping infrastructure may be dynamically scaled depending on the volume of data to be mapped and the amount of time available for mapping. After the data mapping is completed, the mapping infrastructure may be automatically torn down to eliminate the need to maintain a permanent mapping infrastructure. Using the automated data mapping systems and methods described herein reduces the amount of time required to map data in a production environment to a pre-production environment by 50 times to 100 times (e.g., from days to hours or minutes). Additionally, by eliminating human error that occurs in manual mapping processes, the automated mapping systems and processes described herein improve data quality by increasing the accuracy of data mapping across environments.

Figure 6:
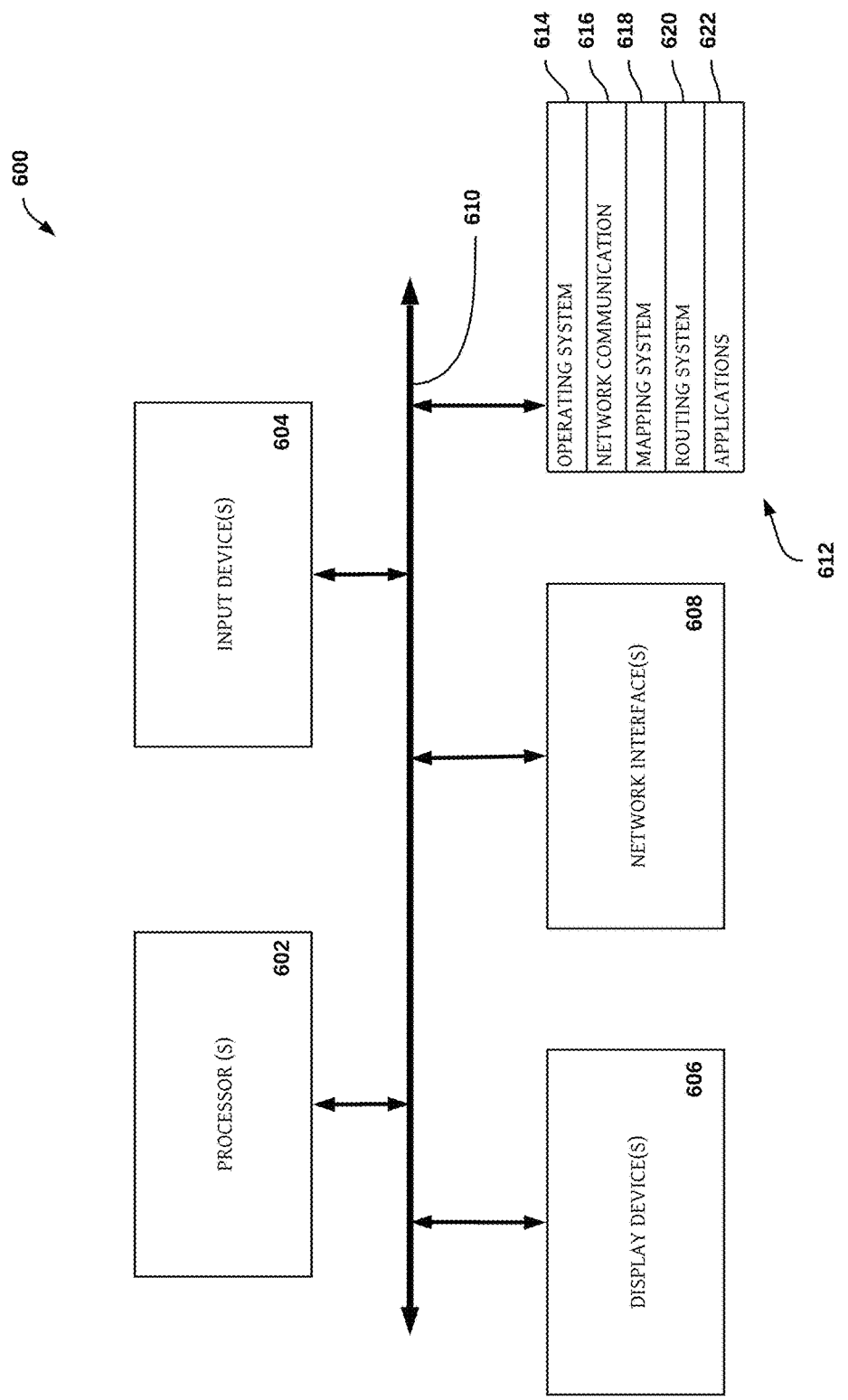
FIG. 6 shows an exemplary computing device according to various embodiments of the present disclosure.

FIG. 1 shows a system for replicating data across deployments in a routing constrained environment according to various embodiments of the present disclosure. System 100 may include a plurality of functional elements that may be provided by one or more computing devices (e.g., one or more computing devices 600 as shown in FIG. 6). These elements may work together to automatically establish routing connections for a shard environment, replicate data across multiple environments, route calls to the correct host, and/or return responses from the intended application instance.

For example, system 100 may include at least one client 160. Client 160 may be any device configured to present UIs 162, including one or more data requests 164, and receive inputs thereto via the UIs 162. For example, client 160 may be a smartphone, personal computer, tablet, laptop computer, or other device.

Source environment 110 and/or target environment 120 may be a software component deployed on one or more hardware components. A source environment 110 and/or target environment 120 may include configurations, settings, and tools that support a particular application. For example, a source environment 110 may be a production environment that supports an application in-production. The in-production application may be implemented as a source deployment hosted by a source environment. The in-production application hosted by the source environment may interface with end users. A target environment 120 may be a staging environment that replicates as closely as possible to the source environment 110 to allow testing of new features in a production-like environment without the risk of compromising application functions, user experience, user data, and the like within the production environment.

System 100 may include a routing system 130, which may be a hardware and/or software component accessible to client 160 through network 140 (e.g., routing system 130 may be hosted by a server computer). As described in greater detail below, routing system 130 may establish routes between entities in a target environment 110 that mimic entity routes in the source environment 120. For example, the routing system 130 may create entities (e.g., new target entities) in a target environment 120 that replicate source entities in a source environment 110. To facilitate data mapping between the source environment 110 and the target environment 120, the routing system 130 may generate a mapping file (e.g., mapping artifact). The mapping file may include route information that maps the location of the target entity in the target environment 120 (i.e., the cluster in the target environment storing the target entity) to the location of its corresponding source entity in the source environment 110 (i.e., the cluster in the source environment storing the source entity).

System 100 may include a mapping system 150, which may be a hardware and/or software component accessible to client 160 through network 140 (e.g., mapping system may be hosted by one or more server computers). As described in greater detail below, the mapping system 150 may facilitate data mapping between a source environment 110 and a target environment 120 by spinning up a data mapping infrastructure on-demand, processing the mapping file generated by the routing system to route data to the correct target entity, and tearing down the data mapping infrastructure once the data mapping process is completed. The data mapping infrastructure may include a plurality of compute instances having memory and processing resources hosted by one or more server computers.

In some embodiments, one or more of client 160, mapping system 150, routing system 130, target environment 120, and/or source environment 110 may communicate with one another through network 140. For example, the client 160 may communicate with a routing system 130 to set up a target environment 120 that mimics the source environment 110. Once the target environment 120 is set up, the client 160 may then communicate with a component of the target environment 120 (e.g., a dispatcher) to route requests for data from an application deployed in the target environment 120 to the right hosting shard. Communication between these elements may be facilitated by one or more application programming interfaces (APIs). APIs of system 100 may be proprietary and/or may be examples available to those of ordinary skill in the art such as Amazon® Web Services (AWS) APIs or the like. Network 140 may be the Internet and/or other public or private networks or combinations thereof.

A single client 160 and separate, single mapping system 150, routing system 130, target environment 120, and/or source environment 110 are shown for ease of illustration, but those of ordinary skill in the art will appreciate that these elements may be embodied in different forms for different implementations. For example, system 100 may include a plurality of clients 160, many of which may access different data. Moreover, single routing system 130, and/or mapping system 150 may each be components of a single computing device (e.g., computing device 600 described below), or a combination of computing devices may provide single routing system 130 and/or mapping system 150. In some embodiments, the operations performed by client 160 and at least one of the separate, single routing system 130 and/or mapping system 150 may be performed on a single device (e.g., without the various components communicating using network 140 and, instead, all being embodied in a single computing device).

Figure 2:
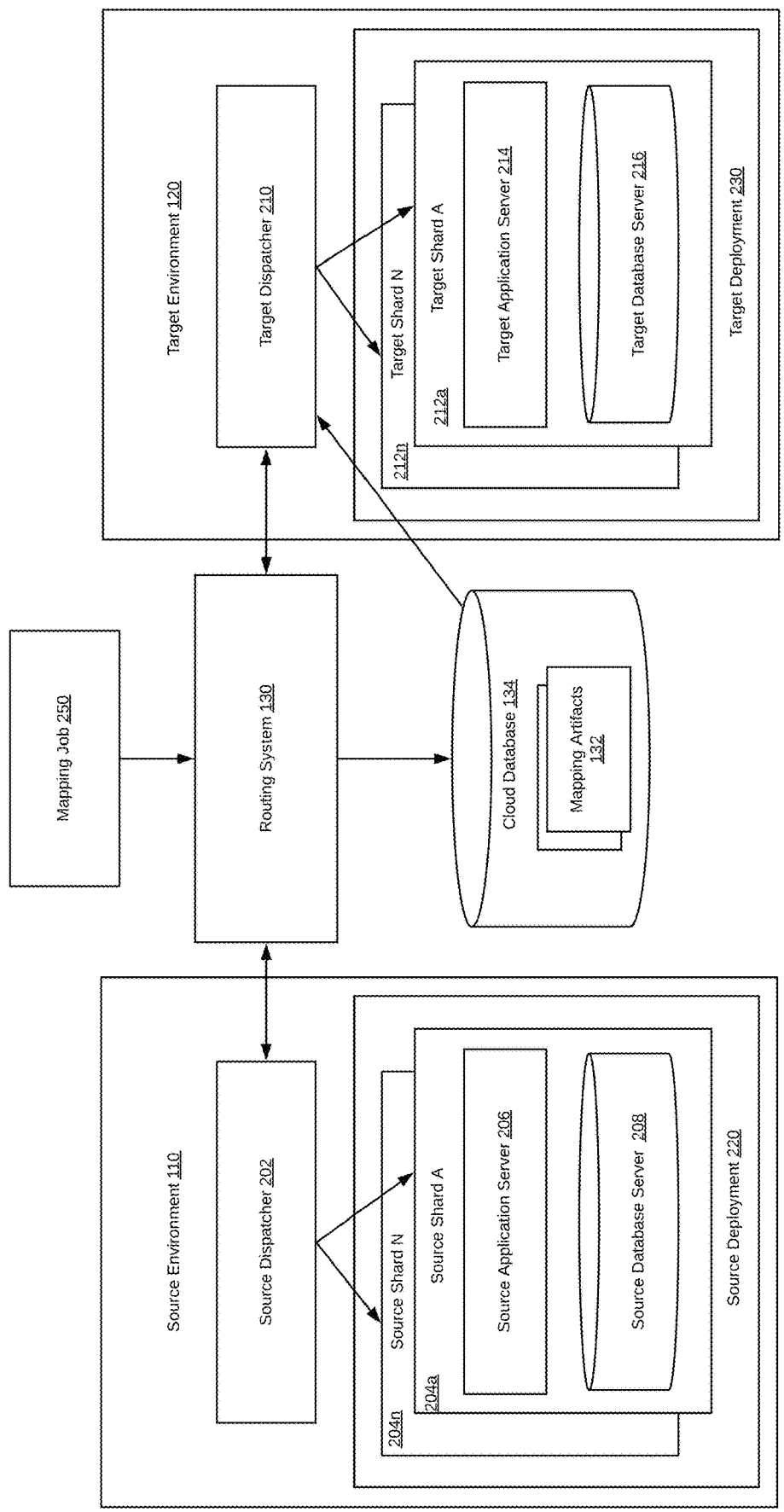
FIG. 2 illustrates more details of an exemplary routing system according to various embodiments of the present disclosure.
Figure 3:
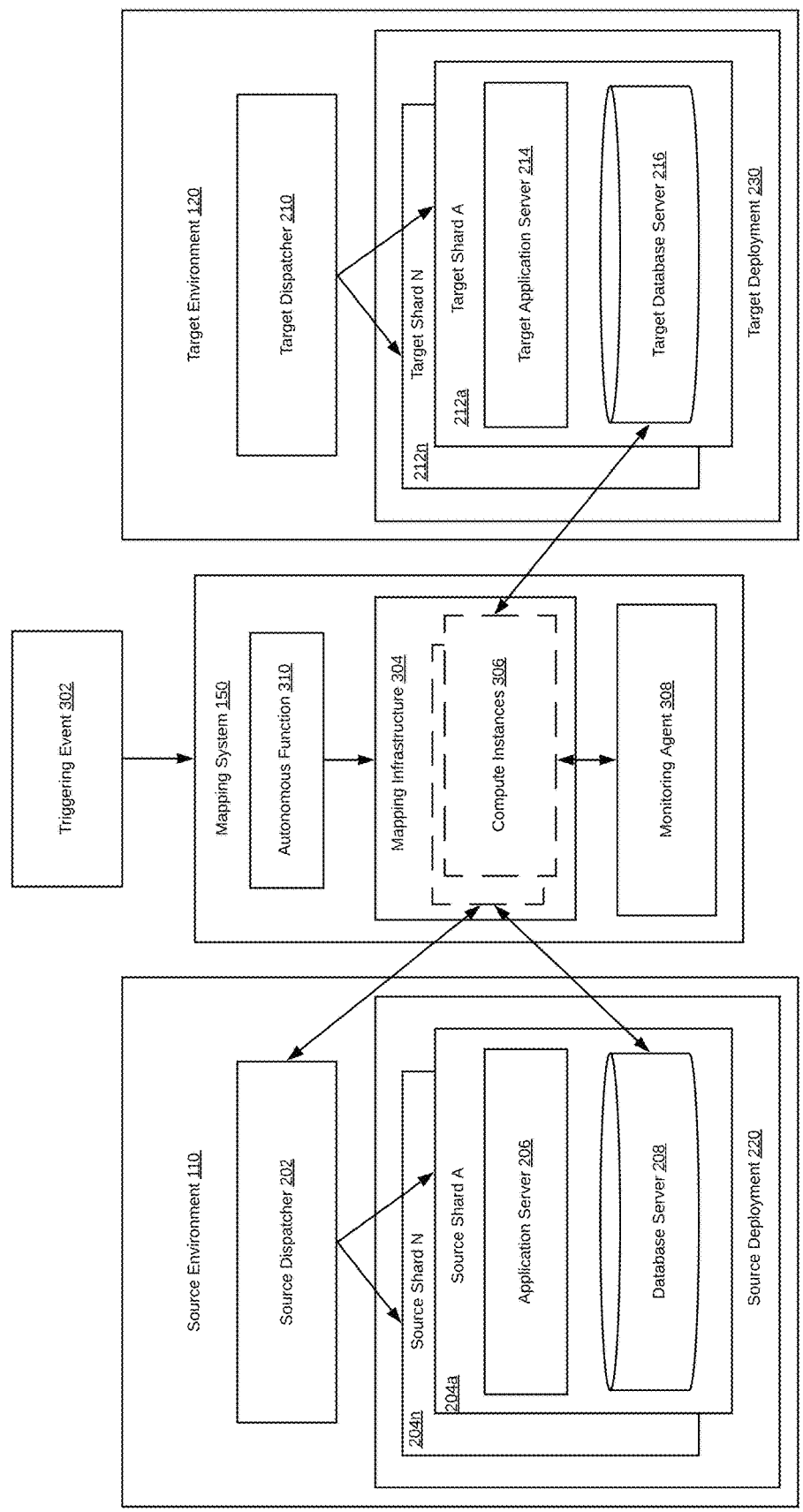
FIG. 3 illustrates more details of an exemplary mapping system according to various embodiments of the present disclosure.

FIG. 2 shows an example routing system 130 and FIG. 3 shows and example mapping system 150 according to various embodiments of the disclosure. As shown in FIG. 2, the routing system 130 may configure a target environment 120 to mimic a source environment 110. For example, the routing system 130 may ensure the target environment 120 and source environment are identical by creating entities, replicating metadata, and registering route information from the source environment 110 in the target environment 120. After the target environment 120 is configured, the mapping system 150 maps data for the modified source entities in the source environment 110 to the equivalent target entity in the target environment 120.

As shown in FIG. 2, the source environment 110 may include a source dispatcher 202 and a source deployment 220. The source environment 110 includes configurations, settings, and tools that support a source deployment 220. For example, the source environment 110 may be a production environment that supports a source deployment 220 including one or more in-production applications and/or databases that interface live with a plurality of end users. As shown in FIG. 2, the source deployment 220 may include a shard architecture having one or more shards 204a-n. Each source shard 204a, 204n may have its own source application server 206 that creates and runs the applications and/or services included in the source deployment 220. Each source shard 204a, 204n may also have a source database server 208 that stores data required by the applications and/or services. Data, applications, services, application operations, and/or service operations required by the source deployment 220 may be distributed across multiple source shards 204a-n to enhance performance and reliability.

The target environment 120 may be a non-production environment that intermediates between a production environment and the local machine of a developer. For example, a target environment 120 may be a pre-production environment such as a staging environment, performance environment, validation environment, testing environment, and the like. The target environment 120 may also be a source environment 110 running a source deployment 220 having one or more services that are not accessible by end users. To ensure security, performance, and reliability, software features and/or updates may be extensively tested in one or more pre-production environments before being integrated into a production deployment that interfaces with end users. For accurate testing, the pre-production environment may be configured to be as similar as possible to a production environment. Having identical pre-production and production environments minimizes the uncertainty and risk associated with integrating new features and/or updates into a production environment. Therefore, the components shown in the target environment 120 replicate the composition, data, and routing of the components of the source environment 110. For example, applications and services executed by the source application server 206 are replicated by the target application server 214. The data hosted by the source database server 208 is replicated on target database server 216. The process of replicating applications, services, and data is repeated for each source shard 202a-n to generate an equivalent number of identical target shards 212a-n. The routing to entities dispersed across source shards 202a-n stored in the source dispatcher 202 must also be replicated on the target dispatcher 210. Replicating route information of the source dispatcher 202 on the target dispatcher 210 ensures requests for data and services from the target deployment 230 are routed to the target environment 120. By replicating data, applications, and services of source shards 204a-n on the target shards 212a-n, the target deployment 230 can accurately simulate the source deployment 220 to allow for production like testing within the target environment 130.

Mapping data from the source environment 110 to the target environment 120 can be a sophisticated process. Data mapping is especially complex in deployments having architectures that distribute data, services, and applications across multiple shards within routing constrained environments. Conventional methods of replicating data across deployments of the same application in different environments involve manual processes that require running a set of scripts to transfer, delete, and/or replace data in the target environment 120. Manual checks on the data model of the target deployment 230 must be run constantly against the data model of the source deployment 220. The manual checks are required to determine which entities (i.e., users, stores, companies, and the like) within the source environment 110 have been modified (e.g., updated or added as new source entities) and require mapping to the target environment 120. As described herein, the term "entity" as used in "source entity" and "target entity" includes any object that may have data and/or be associated with data in an application deployment.

In manual methods of data mapping, once the set of entities requiring mapping (i.e., updating data for an entity the target environment 120 to match new and/or revised data for that entity in the source environment 110) is identified, permissions for accessing each machine involved in the data mapping operation must be obtained. For example, permissions for the mapping infrastructure (i.e., the compute instances executing the mapping scripts), permissions for the machines in the source environment 110 hosting the data to be mapped, and permissions for the machines in the target environment 120 where the mapped data will be hosted may be required before the mapping script can be executed. Each machine included in the mapping infrastructure is then configured by using the permissions to set up a login process and credentials for establishing a secure connection to the source shard(s) 204a-n hosting the source entity and the target shard 212a-n hosting the target entity. Lastly, the data mapping process must be manually monitored until it runs to completion.

Manual data mapping methods are tedious and prone to user error. To map large datasets, thousands of files and/or artifacts must be moved from machines in the source environment 110 to machines in the target environment 120. To orchestrate this process, hundreds of scripts must be moved between hosts using traditional copying techniques. The file transfer process can take three weeks or more. The manual file transfer operations are executed constantly during this period making manual file transfer prone to human error. Large scripts may take several hours to execute, resulting in session timeouts and other delays that may delay progress of the mapping operation by requiring the re-establishment of a connection with a mapping or host machine using a manual login process. In addition to being time consuming and error prone, manual data transfer processes require maintaining a permanent mapping infrastructure including a plurality of compute machines that must be kept running at all times. The permanent mapping infrastructure must be constantly maintained whether or not the machines are in use. The cost of running and maintaining a permanent mapping infrastructure is significant and computing, memory, and network resources are frequently wasted during machine down time.

Described herein are automated techniques for data mapping across deployments in separate routing constrained environments. The automated data mapping techniques described herein improve the testing process for new/updated features and/or services by making target deployments 230 and target environments 120 more identical to source deployments 220 and source environments 110. The automated data mapping techniques may make target deployments 230 and environments 120 more identical to source deployments 220 and environments 110 by, for example, automating the process of identifying newly created and/or newly updated entities in the source environment. Target environments that are created and maintained using the automated mapping processes described herein yield testing results that are more accurate, reliable, and likely to be replicated when repeated in a production environment.

The automated data mapping techniques are generalizable to any target environment including, for example, environments for hosting multiple production deployments, environments for staging, testing, and/or validating new/updated features and/or services, and the like. The automated data mapping techniques may also facilitate more efficient data mapping between target environments 120 and source environments 110 by establishing routes between the dispatcher and the host shard receiving the mapped data and automatically setting up the mapping infrastructure. The automated data mapping techniques may also execute scripts on compute instances included in the mapping infrastructure to more efficiently and accurately map data from a source environment to a target environment. By monitoring the progress of the mapping process through completion, problems that occur during mapping can be identified and resolved quickly to further increase the efficiency of data mapping operations. The automated data mapping techniques may also eliminate the need for a permanent mapping infrastructure by tearing down the mapping infrastructure upon completion of a mapping operation.

Automating the manual data mapping process also improves aspects of data mapping. In particular, automated data mapping processes reduce the amount of human error and time required to complete data mapping projects. In various embodiments, the time required to complete a large data mapping project may be reduced by 50 times to 100 times by using the automated methods described herein. For example, a mapping operation that takes 3 weeks to complete using manual techniques can be completed in 3 to 4 hours using the automated techniques described herein. The permanent mapping infrastructure required by manual methods may also be replaced by an on-demand mapping infrastructure that may be efficiently created, configured, dynamically scaled, and torn down upon completion of each mapping process. The on-demand mapping infrastructure described herein has no down time and thereby conserves significant amounts of processing, memory, and networking resources. The automated mapping techniques also provide more frequent, detailed, and precise monitoring and error logging to enable real time detection of errors, instantaneous suspension of the mapping operations, and instantons restart once the error is resolved.

As shown in FIG. 2, a routing system 130 may perform the first phase of the automated data mapping process. In various embodiments, the routing system 130 may receive a mapping job 250 from a client 160. The mapping job 250 may be sent manually and/or automatically in response to a triggering event, for example, a modification to a source environment 110. In various embodiments, source environment 110 modifications that may be triggering events include, for example, creation of a new entity, updates to an existing entity, and the like. The mapping job 250 may include one or more parameters that are passed to the routing system 130, for example, a list of entity IDs (identifiers) that need to be mapped and/or permissions/credentials for accessing a source environment 110 and/or a target environment 120. The routing system 130 may use the credentials to access one or more components of the source environment 110 and/or target environment 120.

Upon accessing the source environment 110, the routing system 130 may then pass a list of entity IDs that need to be mapped to a source dispatcher 202 to obtain route information, including the shard and host information for each of the entity IDs. In various embodiments, shard and host information may include shard ID (identifier), realm ID, database server ID, access information, and the like. Upon accessing the target environment 110, the routing system 130 may create new entities in the target environment 120 for each entity in the list that is not currently in the target environment 120. The target dispatcher 210 may then register the route to the new entity in the target environment 120 by generating route information (i.e., the shard and host information) for the newly created entities. For entity IDs that are already in the target environment 120, the routing system 130 may obtain route information for each entity ID from the target dispatcher 210.

The routing system 130 may then generate a mapping artifact 132 including route information for entity IDs included the mapping job 250. The route information may be used to route requests (e.g., data requests, messages, and the like) to a particular shard or cluster in a routing constrained environment. By identifying shards storing data in particular deployments, the route information enables multiple deployments to have common entity names and identical data. To facilitate automatic execution of the mapping operation by the mapping system, the mapping artifact 132 may also include permissions for accessing the source environment 110 and/or target environment 120. In various embodiments, the mapping artifact 132 is a CSV file including the source entity ID, the target entity ID, a new user name, and/or a new user password. The source entity ID may comprise the name of the source entity and the source shard in the source environment hosting the source entity. The target entity ID may comprise the name of the target entity and the target shard in the target environment hosting the target entity. The routing system 130 may write generated mapping artifacts 132 to a designated location within a cloud database 134, for example, a company map folder in an S3 bucket. Mapping artifacts 132 may be generated for each entity ID included in the mapping job 250 and/or a subset of all entity IDs listed in the mapping job 250. For example, mapping artifacts 132 generated by the routing system 130 may include all entity IDs that must be newly created in the target environment 120 and/or all entity IDs that are already present in the target environment 120 and must be updated.

In various embodiments, uploading a mapping artifact 132 to a cloud database 134 may automatically trigger execution of a mapping script by the mapping system 150. FIG. 3 illustrates an exemplary mapping system 150. As shown in FIG. 3, in response to detecting a triggering event 302, for example, a mapping artifact uploaded by a routing system 130, the mapping system 150 may retrieve the mapping artifact 132 from a cloud database 134 and generate a mapping infrastructure 304 to execute the mapping scripts required to transfer data for entities included in the mapping artifact 132 from the source environment 110 to the target environment 120. To create the mapping infrastructure 304, the mapping system 150 may automatically run an autonomous function 310 in response to detecting an upload of a mapping artifact, modification of the cloud database 134, a modification to the source environment 110, and/or another triggering event 302.

The autonomous function 310 may generate a mapping infrastructure 304 including an auto scaling service 312 and one or more compute instances 306 or other machines. The autonomous function 310 may be a lambda function implemented in a programming language such as python that creates compute instances 306 within a virtual private cloud accessible by the mapping system 150. The autonomous function 310 may be programed to have an identity and access management (IAM) role that allows it to, upon execution, create and manage compute instances 306 within a private cloud. The autonomous function 310 may interface with the auto scaling service 312 to automatically scale a number of compute instances 306 to facilitate faster data mapping.

The autonomous function 310 may create compute instances 306 from a pre-defined baseline machine image (e.g., an Amazon machine image) that may define the instance type, specifications, IAM roles, permissions, access requirements and other properties of each compute instance 306. Creating compute instances 306 using the same pre-defined baseline machine image improves the efficiency of instance configuration by ensuring that all of the instances have the same configurable parameters. The common parameter set may then be configured using the same automated initialization script. Using the pre-defined baseline machine image may also streamline dynamic scaling of the mapping infrastructure 304. For example, standardizing the amount of processing and memory resources included in each compute instance 306 allows the auto scaling service 312 to efficiently determine performance metrics for each compute instance 306 and the collective mapping infrastructure 304. In response to determining the performance metrics (e.g., total processing capacity, CPU utilization percentage, memory usage, input/output characteristics, and the like), the auto scaling service 312 can incrementally adjust the performance of the mapping infrastructure 304 to meet the demands of the mapping system 150 by adding and/or subtracting compute instances 306.

The autonomous function 310 may also include an initialization script that automatically configures each created compute instance 306. The autonomous function 310 may configure each compute instance 306 by installing one or more utilities, tools, and/or libraries required to execute mapping scripts (e.g., sqlplus) and/or creating one or more folders for intermediate storage of mapped data. The compute instances 306 may also be set up to have an IAM role within the virtual private cloud that allows the compute instances 306 to download mapping artifacts and other objects from the cloud database 134 and/or send email notifications. In various embodiments, the compute instances 306 may communicate error logging information and/or status updates to users and/or clients 160 over email (e.g., via SES) to enable real time monitoring of the performance and/or process of each compute instance 306 while executing one or more mapping scripts.

Once initialized, the compute instance 306 reads the mapping artifacts and executes a mapping script to map data for entity IDs included in each mapping artifact. In various embodiments, the mapping script executed by the compute instances 306 passes each source entity ID included in the mapping artifact to the source dispatcher 202. For each entity ID included in the mapping artifact, the source dispatcher 202 routes the request to the source shard 204$a$-$n$ and database server 208 hosting the requested entity and returns the entity data. Entity data retrieved from the source environment 110 is then written to the target shard 212$a$-$n$ and target database server 216, thus persisting the requested entity ID in the target environment 120. This process of calling the source dispatcher 202, reading the source database server 208 persisting the entity data, and writing the entity data to the target database server 216 hosting the entity in the source environment 120 may be repeated until every entity ID in the mapping artifact has been mapped.

After mapping all entity IDs in a mapping artifact, the mapping system 150 may download a new mapping artifact from the cloud database 134. The mapping system 150 may then execute a mapping script to map data for each entity ID included in the new mapping artifact. This process may be repeated until all mapping artifacts generated by the routing system 130 for a particular mapping project are processed by the mapping system 150. To increase the speed of data mapping, mapping scripts for different and/or the same entity IDs may be executed in parallel on multiple compute instances 306. For example, parallelized mapping scripts may map data for different entities included in the same mapping artifact using different compute instances 306. For entities having a large volume of data, additional compute instances 306 may be spun up to map different portions of data for the same entity. The mapping system 150 may dynamically scale the number and/or capacity of the compute instances 306 within the mapping infrastructure 304 to speed up the mapping operation.

The auto scaling service 312 may manage scaling operations within the mapping infrastructure 304. The auto scaling service 312 may scale the mapping infrastructure 304 based on available compute resources to reduce processing time and increase efficiency. For example, the auto scaling service 312 may scale the mapping infrastructure 304 to minimize system down time, increase utilization of each computer instance, balance the load of each computer instance 306, and the like. The auto scaling service 312 may initiate scaling events based on one or more pre-defined rules and/or metric thresholds. For example, the auto scaling service 312 may record performance metrics for the compute instances 306 and/or mapping infrastructure 304. The performance metrics may include, for example, CPU utilization percentage, input/output characteristics, memory usage, processing capacity, and the like. The auto scaling service 312 may monitor the performance metrics and compare one or more of the metrics to a threshold for the metric. When one or more of the metrics exceed and/or drop below the corresponding metric, the auto scaling service 312 may initiate a scale up or a scale down event.

Once a scale up or scale down event is initiated, the auto-scaling service 312 may read a minimum or maximum number of compute instances 306 and/or a pre-defined baseline AMI defining the type of compute instance 306 required by a configuration of the virtual private cloud. To scale up the mapping infrastructure 304, the auto-scaling service 312 may spin up additional compute instances 306 using the pre-defined baseline AMI. The auto scaling service 312 may spin up new compute instances 306 as needed to meet demand of the mapping system 150 as long as the number of compute instances 306 does not exceed the maximum number of instances allowed by the virtual private cloud. New instances created by the auto scaling service 312 are then configured using the initialization script as described above. The new instances start mapping data by executing a mapping script received from the mapping system 150. To scale down the mapping infrastructure 304, the auto scaling service 312 may tear down compute instances 306 as needed to meet the demand of the mapping system 150 as long as the number of compute instances 306 does not drop below the minimum number of instances allowed by the virtual private cloud.

To monitor each mapping script executed by the compute instances 306, the mapping system 150 creates a mapping script ID that is persisted until the mapping script is fully executed. Progress for each mapping script may be monitored using a monitoring agent 308 implementing monitoring service (e.g., Cloudwatch). The monitoring agent 308 may use the monitoring service to stream progress updates including the output of each active mapping script having a unique script ID to a group and/or stream address. Upon completion of a mapping script, the mapping system 150 may send an email notification to a client 160 including the entity data that was mapped and the login data required to access the mapped data in the target environment 120. Upon sending an email notification confirming completion of the last mapping script for the last entity ID in the final mapping artifact for a mapping project, the mapping system 150 may execute a shutdown command. The shutdown command may cause each compute instance 306 to be shut down and may result in a total tear down of the mapping infrastructure 304. Tearing down the mapping infrastructure 304 ensures that the compute instances 306 are not running or maintained when they are not in use. The tear down function creates lightweight, flexible mapping system 150 that does not require a permanent mapping infrastructure 304. By eliminating the down time of a permanent mapping infrastructure 304, the mapping system 150 saves processing, memory, and network resources.

Figure 4:
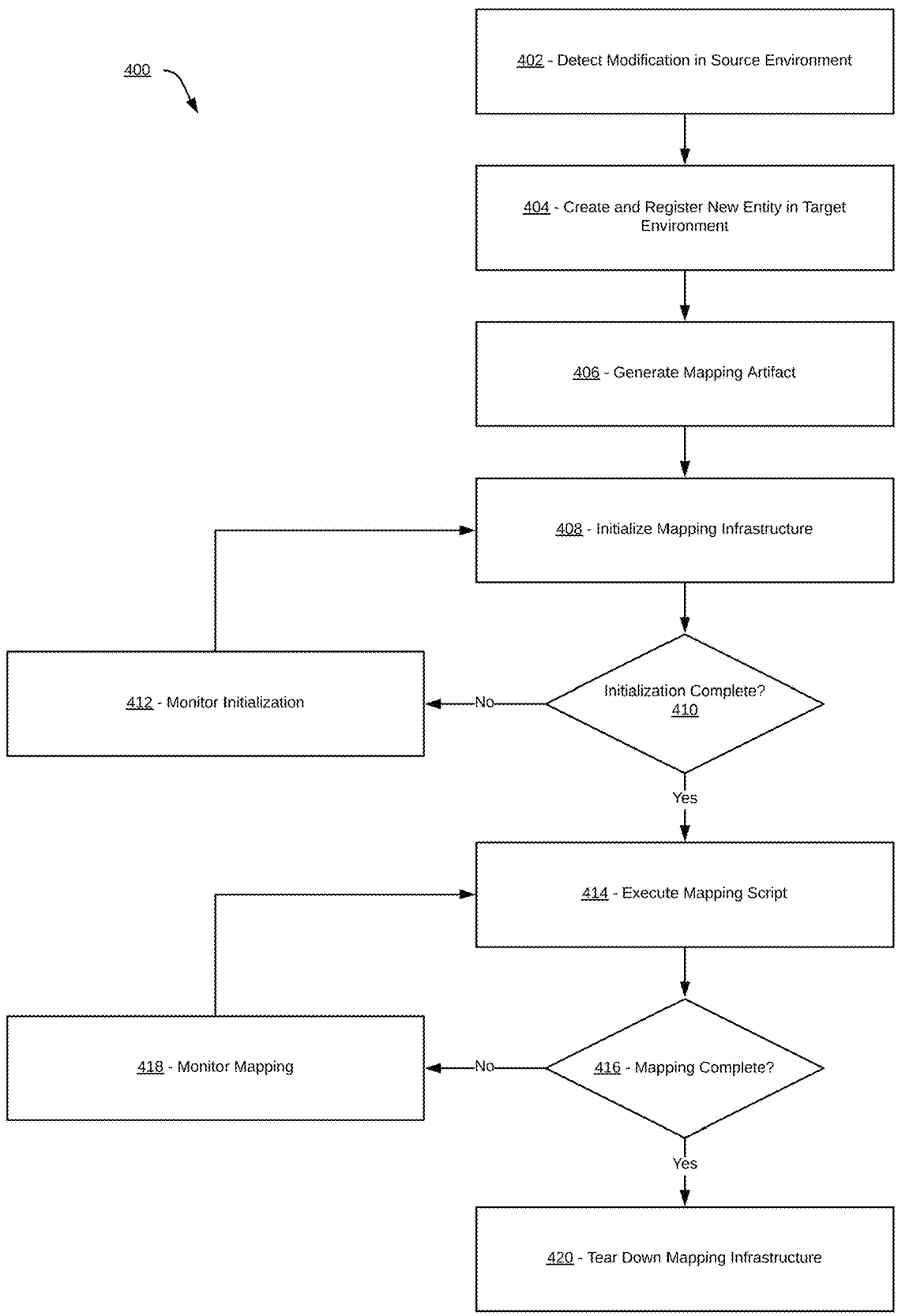
FIG. 4 is a flow chart illustrating an exemplary method of replicating data across deployments in a routing constrained environment according to various embodiments of the present disclosure.

FIG. 4 illustrates an exemplary method 400 of replicating data across deployments in a routing constrained environment. The routing system and/or mapping system described above may perform this method 400 to map data for new and/or updated entities in a source environment to a target environment. In various embodiments, the exemplary data mapping method 400 may be used to add and/or update data in a pre-production deployment within a target environment to mirror changes made to an in-production deployment within a source environment. For example, a user adding and/or updating an entity within and in-production deployment hosted in a production environment may trigger execution of the data replication method to update a pre-production deployment hosted in a testing environment.

At step 402, a modification is detected in a source environment. Modifications to a source environment (e.g., new data, updated data, new source entities, and the like) may be detected using manual and/or automatic processes. For example, a monitoring agent within the source environment may send a notification (e.g., push notification, email, and the like) to a client indicating that one or more changes have been made to a deployment within a source environment. A user may receive the notification and manually trigger a data replication process by initializing the routing system. Additionally, a monitoring service may detect a modification within a source environment. The monitoring service may be integrated with a routing system to automatically initiate a data replication process in response to detecting the modification. For example, the routing system may receive an alert from the monitoring service when new entity data is uploaded within the source environment. The alert may trigger execution of an autonomous function that begins a data replication process by initializing the routing system.

Once the routing system is initialized, optionally, if a new entity is detected in the source environment, the routing system may create a new entity in the target environment at step 404. The routing system may create new entities by first creating a blank entity in the target environment. The routing system may then update the name of each blank entity to match the name of its new entity in the source environment. New entities may then be registered with the target dispatcher in the target environment so that the target dispatcher can route requests for new entity data to the target shard and target database server hosting the new entity. The routing system may determine the shard and host information (e.g., shard ID, database server ID, realm ID, access information, and the like) for the new entity and provide this information to the target dispatcher to register the new entity.

If the detected change to the source environment is an update of an existing entity, the existing entity may already be hosted by a target shard within the target environment and registered with the target dispatcher. Therefore, the routing system may bypass entity creation at step 404. For updated entities, the routing system may send a confirmation to the target dispatcher to confirm the updated entity's shard and host information are accurate. The routing system may also send updated shard and host information to the target dispatcher if the updated entity is moved to a different host. For example, if additional data added to the updated entity causes the entity to exceed the available storage capacity of the existing host, the updated entity may be migrated to a new host with more capacity and/or have its entity data stored on two or more hosts.

At step 406, the routing system generates mapping artifacts including all new and/or updated entities identified at step 402. In various embodiments, the mapping artifacts may include mapping information (e.g., source environment entity ID target environment entity ID, route information, and the like) and access credentials (e.g., a user name and password). Mapping artifacts generated by the routing system may then be uploaded to a cloud database. In various embodiments, uploading one or more mapping artifacts may trigger the initialization of the mapping infrastructure by the mapping system at step 408. Once all of the mapping artifacts are processed by the mapping system, the access credentials may be used by the target dispatcher to access the mapped entities in the target environment.

At step 408, the mapping infrastructure may be initialized by executing an autonomous function, for example, a lambda function implemented as a block of python code. By executing the lambda function, the mapping system automatically creates one or more compute instances within a private compute cloud and configures the instances for data mapping operations. To create the compute instances, the lambda function may have an identity and access management (IAM) role within the private compute cloud that allows it to spin up compute instances upon execution. The IAM role of the lambda function may also allow the mapping system to dynamically scale the mapping infrastructure by giving the lambda function permissions to spin up additional compute instances in response to triggers from the auto scaling service. Dynamically scaling the mapping infrastructure may accelerate the data mapping operation by parallelizing execution of one or more mapping scripts across multiple compute instances. The lambda function may configure the compute instances by passing an initialization script that causes the compute instances to perform one or more operations to sets up and configure the instance. For example, the initialization script may cause the instance to install one or more libraries, utilities, and/or tools required to execute the data mapping scripts. The initialization script may also cause the compute instances to create a data model within the instance for organizing mapped data copied by the compute instance.

A monitoring agent within the mapping system may monitor initialization of the mapping infrastructure by tracking the status of each compute instance created by the lambda function. To enable real time monitoring, each compute instance may have an assigned IAM role that allows the compute instance to send a notification to client, for example, an email via SES. In various embodiments, the compute instances may send a notification to a client upon completion of each step in the initialization process. At step 410, the monitoring agent may check to see if initialization of one or more compute instances is complete. If the initialization process is fully executed, the compute instance may send a notification confirming that the compute instance is fully set up and ready to execute mapping scripts at step 414. If the initialization process is not complete, the lambda function may continue initializing mapping infrastructure at step 408 by configuring each compute instance. The mapping system may also continue to monitor initialization at step 412 until each compute instance is fully set up.

Once the mapping infrastructure is initialized, compute instances may download mapping artifacts from the cloud database and begin mapping data to the target environment by executing one or more mapping scripts at step 414. Upon executing the mapping scripts, the compute instances may extract new and updated entity IDs from the downloaded mapping artifacts. The compute instances may then fetch the data for each new and/or updated entity from the source deployment by passing a list of new and/or updated entity IDs to the source dispatcher. The source dispatcher may route the request to the source shard and source database server hosting the one or more entity IDs included in the request and return the entity data. The compute instances may then copy the entity data to the compute instance data model for temporary storage and write the entity data to the target deployment in the target environment. After mapping, requests for the new entity data in the target environment are routed to the target shard and target database server hosting the new/updated entity by the target dispatcher.

A monitoring agent included in the mapping system may monitor the progress of each mapping script executed by the compute instances. In various embodiments, the monitoring agent may assign each mapping script a process ID that is maintained until the mapping script is completed and closes. The monitoring agent may stream status updates for each process ID via a streaming service to a streaming address accessible by the client. The status update for each process ID may include, for example, a current status for the process (e.g., percent completed, time remaining, and the like) and real time output of each mapping script. By including a real time output of each mapping script, the streams can provide a record of all data written by every compute instance executing a mapping script. The real time record of all data writes is stored in a cloud database so that it is reviewable and may be used for troubleshooting, error diagnosis, auditing, and the like.

At step 416, the monitoring agent may check to see if all mapping scripts are complete. If all mapping scripts are fully executed, the monitoring agent may send a notification to a client confirming the mapping process is completed. The notification may include a record of all the entity data that was mapped and login information for accessing the mapped data in the target environment. The mapping system may then initiate a tear down process to shut down all of the compute instances in the mapping infrastructure at step 420. The mapping system may tear down the mapping infrastructure by executing a shutdown command that automatically shuts down the compute instance upon detecting a period of inactivity or another shut down trigger. At step 416, if one or more mapping scripts are still in progress, the compute instances may continue to execute mapping scripts at step 414. The monitoring agent may continue monitoring progress of the mapping scripts associated with live process IDs at step 418 until all mapping scripts are completed.

Figure 5:
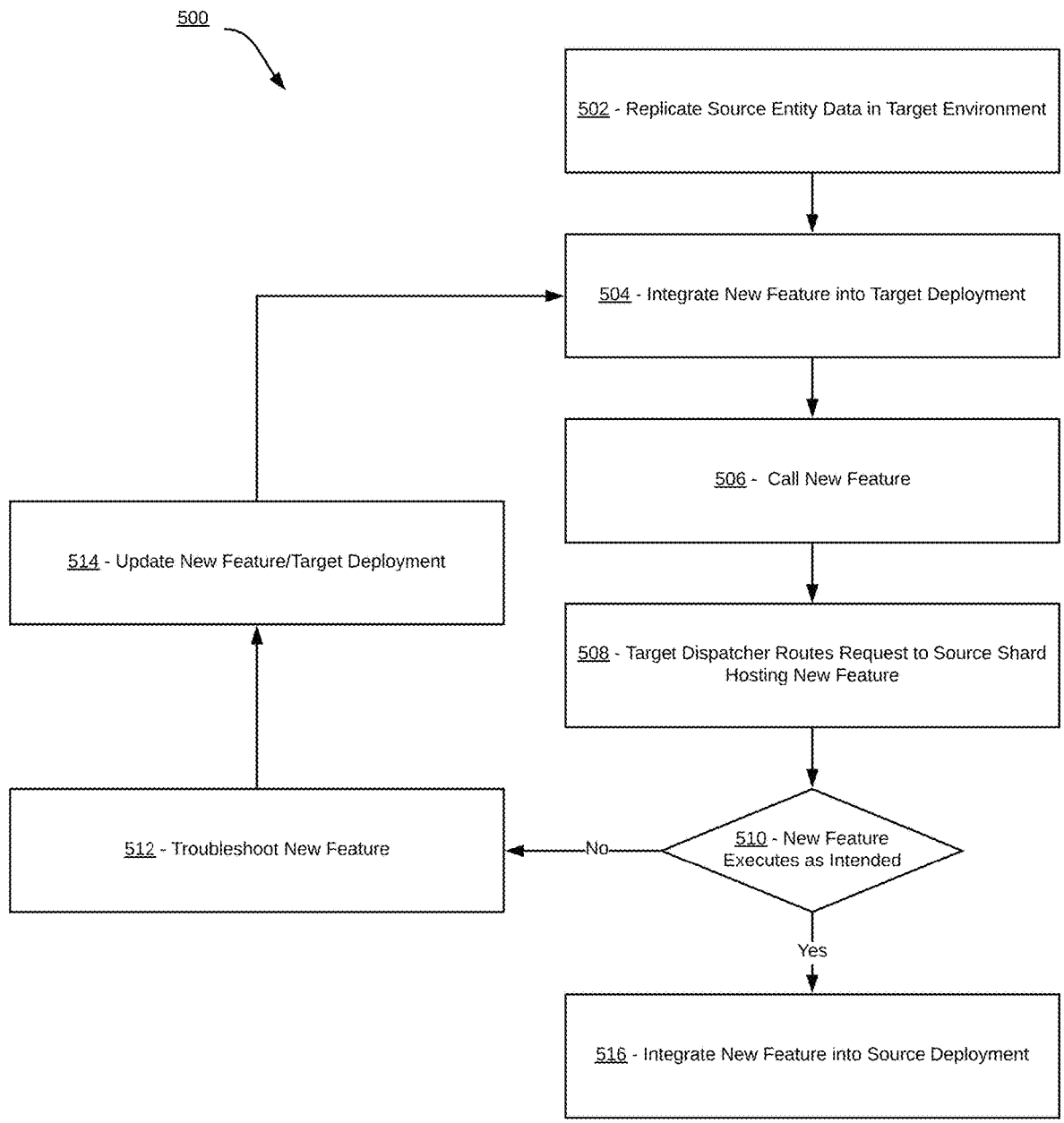
FIG. 5 is a flow chart illustrating an exemplary method testing a new application feature in an updated target environment according to various embodiments of the present disclosure.

FIG. 5 illustrates an exemplary method 500 of testing a new feature in a target environment including data mapped from a source environment. At step 502, new and/or updated entity data included in the source environment may be replicated in the target environment using the mapping process described in FIG. 4. Executing the mapping process described above enables the target deployment and the target environment to more closely resemble the source deployment and the source environment. In various embodiments, the target environment may be a staging environment for testing a staging version of a web application (i.e., the target deployment) and the source environment may be a production environment that supports a live in-production version of a web application (i.e., the source deployment).

At step 504, a new feature may be integrated into the target deployment. For example, a new application feature, a new search functionality, new user interface design, new data analysis feature, and the like may be merged into the target deployment. In various embodiments, the target deployment may be implemented in a shard architecture that distributes data, services, and/or applications across multiple shards having distinct database servers and application servers. At step 506, a client calls the new feature by submitting a request to the target deployment. To execute the new feature, the target dispatcher may route the request to a source shard hosting the new feature. For example, the target dispatcher may route the request to a source shard hosting a source application server that operates one or more application instances responsible for performing the new feature. If able, the target application server may then execute the new feature and return the result to the client.

At step 510, the client may check to see if the new feature executes as intended. The client may verify the new feature executes as intended using a manual and/or automated process. For example, the client may evaluate whether the new feature works by automatically comparing the output of the new feature to a pre-defined result. If the new feature generates the expected result the client may determine the new feature works as intended. If the new feature generates an unexpected result, the client may determine the new feature does not work as intended. The client may also evaluate the performance of the target deployment while executing the new feature. For example, the client may measure one or more performance metrics of the target deployment when the new feature is called and/or when one or more other features are called. If the performance of the target deployment improves and/or remains constant when executing the new feature and/or one or more existing features, the client may determine that the new feature performs as intended and does not disrupt the performance of the target deployment. If the performance of the target deployment gets worse according to one or more performance metrics, the client may determine that the new feature does not work as intended.

If, at step 510, the new feature is determined to work as intended, the new feature may be integrated into the source deployment (i.e., the production version of the web application) at step 516. If the new feature does not work as intended, a client and/or user may troubleshoot the new feature, for example, by checking error logs, implementing error logging, reviewing the new feature code, rebuilding the application, and the like at step 512. After isolating the problem with the new feature and/or the target deployment, the new feature and/or target deployment may be updated to resolve the issue at step 514. The updated new feature may then be integrated into the target deployment at step 504 and re-tested in the target environment.

For example, a new application feature may inhibit one or more features of an target deployment of an application. After determining the new application feature does not work as intended, the new application feature may be troubleshooted to determine the error. Once the error in the new application feature is identified, the new application feature may be updated to resolve the error. The updated new application feature may then be integrated into the target deployment of the application a re-tested in the target environment.

FIG. 6 shows a computing device according to an embodiment of the present disclosure. For example, computing device 600 may function as client 160 (which may include a system for mapping data across deployments in a routing constrained environment 100) in some embodiments; one or more servers or other devices configured to provide a system for mapping data across deployments 100 including a routing system 130 and/or a mapping system 150; or a portion or combination thereof in some embodiments. The computing device 600 may be implemented on any electronic device that runs software applications derived from compiled instructions, including without limitation personal computers, servers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable mediums 612. Each of these components may be coupled by bus 610, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, camera, and touch-sensitive pad or display. Bus 610 may be any known internal or external bus technology, including but not limited to ISA, EISA, PCI, PCI Express, USB, Serial ATA, or FireWire. Computer-readable medium 612 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 612 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 may establish and maintain network connections (e.g., software for implementing communication protocols, such as TCP/IP, HTTP, Ethernet, telephony, etc.).

Mapping system instructions 618 may include instructions that enable computing device 600 to function as a mapping system and/or to provide mapping system functionality (e.g., replicating data from a source environment in a target environment) as described herein. Routing system instructions 620 may include instructions that enable computing device 600 to function as a routing system 130 and/or to provide routing system 130 functionality (e.g., creating new entities, generating mapping artifacts, and the like) as described herein.

Application(s) 622 may be an application that uses or implements the processes described herein and/or other processes. For example, a target application instance that calls a target deployment. The processes may also be implemented in operating system 614. For example, application 622 and/or operating system 614 may present UIs 162 including data requests 164 received from a target deployment hosted by a target environment as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a backend component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of replicating data across deployments in a routing constrained environment, the method comprising:
   detecting a modification within a source environment including a source shard hosting a source deployment of an application, wherein the detected modification changes data for a source entity included in the source deployment; and
   updating a target environment including a target shard hosting a target deployment of the application to mirror the modification within the source environment by:
      generating a mapping artifact comprising a piece of route information for the source entity having changed data and a piece of route information for the target entity within the target environment receiving the changed data, wherein the piece of route information for the target entity identifies the target shard within the target environment that hosts the target entity;
      creating a mapping infrastructure including one or more compute instances that replicate the changed data for the source entity in the target entity; and
      executing, by the one or more compute instances, a mapping script that replicates the changed data from the source entity in the target entity based on the mapping artifact by copying changed data from the source environment and writing it to a database included in the target shard within the target environment identified in the piece of route information for the target entity.

2. The method of claim 1, wherein updating the target environment further comprises:
   monitoring the one or more compute instances executing the mapping script to determine a status of the mapping script and generate a record of the changed data replicated during execution of the mapping script;
   sending a notification to a client including the status of the mapping script and the record of replicated changed data; and
   in response to determining the mapping script is completed, tearing down the mapping infrastructure by shutting down the one or more compute instances.

3. The method of claim 1, wherein the modification comprises creating a new source entity in the source environment and the changed data comprises data added to the new source entity.

4. The method of claim 3, wherein updating the target environment further comprises:
   creating a new target entity in the target environment that maps to the new source entity; and
   registering the new target entity by providing a piece of route information for the new target entity to a target dispatcher.

5. The method of claim 1, wherein the source environment is a production environment and the source deployment is a production version of a web application, and wherein the target environment is a pre-production environment and the target deployment is a staging version of the web application.

6. The method of claim 5, further comprising:
   integrating a new application feature into the target deployment; and
   testing the new application feature in the updated target environment to simulate performance of the production version of the web application after incorporating the new application feature.

7. The method of claim 6, wherein the testing further comprises:
   confirming the new application feature works as intended in the updated target environment; and
   integrating the new application feature into the production version of the web application hosted by the source environment in response to the confirming.

8. The method of claim 6, wherein the testing further comprises:
   confirming the new application feature does not work as intended in the updated target environment;
   updating an aspect of the new application feature;
   re-integrating the new application feature into the target deployment;
   testing the updated new application feature in the updated target environment;
   confirming the new application feature works as intended in the updated target environment; and in response to the confirming, integrating the new application feature into the production version of the web application hosted by the source environment.

9. The method of claim 1, wherein the source environment and the target environment have a shard architecture that distributes data and services included in the application across a plurality of shards, wherein each shard has a database server and an application server.

10. The method of claim 1, wherein updating the target environment further comprises initializing the one or more compute instances by executing an initialization script on each compute instance, wherein the initialization script installs a utility required to execute the mapping script and generates a local data model that stores the changed data copied from the source environment.

11. The method of claim 1, wherein updating the target environment further comprises:
   initializing the one or more compute instances by executing an initialization script;
   monitoring the initializing of the one or more compute instances to determine a status of the initialization script; and
   upon completion of the initialization of the one or more compute instances, creating a process ID for monitoring execution of the mapping script by each of the one or more compute instances.

12. The method of claim 1, wherein the mapping infrastructure is created and torn down by an autonomous function that is automatically executed in a compute cloud in response to a triggering event.

13. An automated data mapping system for replicating data across deployments in a routing constrained environment comprising:
   a memory; and
   a processor in communication with the memory and configured to:
      detect a modification within a source environment including a source shard hosting a source deployment of an application, wherein the detected modification changes data for a source entity included in the source deployment; and
      update a target environment including a target shard hosting a target deployment of the application to mirror the modification within the source environment by:
         generating a mapping artifact comprising a piece of route information for the source entity having changed data and a piece of route information for the target entity within the target environment receiving the changed data, wherein the piece of route information for the target entity identifies the target shard within the target environment that hosts the target entity;
         creating a mapping infrastructure including one or more compute instances that replicate the changed data for the source entity in the target entity; and
         executing, by the one or more compute instances, a mapping script to replicate the changed data from the source entity in the target entity based on the mapping artifact by copying changed data from the source environment and writing it to a database included in the target shard within the target environment identified in the piece of route information for the target entity.

14. The system of claim 13, wherein the updating a target environment further comprises:
   monitoring the one or more compute instances executing the mapping script to determine a status of the mapping script and generate a record of the changed data replicated during execution of the mapping script;
   sending a notification to a client including the status of the mapping script and the record of replicated changed data; and
   in response to determining the mapping script is completed, tearing down the mapping infrastructure by shutting down the one or more compute instances.

15. The system of claim 13, wherein the modification includes creating a new source entity in the source environment and the changed data includes data added to the new source entity.

16. The system of claim 15, wherein the updating the target environment further comprises:
   creating a new target entity in the target environment that maps to the new source entity; and
   registering the new target entity by providing a piece of route information for the new target entity to a target dispatcher.

17. The system of claim 13, wherein the processor is further configured to:
   integrate a new application feature into the target deployment; and
   test the new application feature in the updated target environment to simulate performance of a production version of the application after incorporating the new application feature.

18. The method of claim 17, wherein, the testing the new application feature further comprises:
   confirming the new application feature works as intended in the target environment; and
   integrating the new application feature into the production version of the application hosted by the source environment in response to the confirming.

19. The system of claim 13, wherein the updating the target environment further comprises:
   initializing the one or more compute instances by executing an initialization script;
   monitoring the initializing of the one or more compute instances to determine a status of the initialization script; and
   upon completion of the initialization of the one or more compute instances, creating a process ID for monitoring execution of the mapping script by each of the one or more compute instances.

20. A client device comprising:
   a display;
   an input device; and
   a processor in communication with the display and the input device and configured to:
      detect a modification within a source environment including a source shard hosting a source deployment of an application, wherein the detected modification changes data for a source entity included in the source deployment;
      in response to detecting the modification, receive, from the input device, a request to update a target environment including a target shard to mirror the modification made within the source environment, wherein the target environment hosts a target deployment of the application; and
      update the target environment by:
         generating a mapping artifact comprising a piece of route information for the source entity having changed data and a piece of route information for the target entity within the target environment receiving the changed data, wherein the piece of route information for the target entity identifies the target shard within the target environment that hosts the target entity;

creating a mapping infrastructure including one or more compute instances that replicate the changed data for the source entity in the target entity; and executing, by the one or more compute instances, a mapping script to replicate the changed data from the source entity to the target entity based on the mapping artifact by copying changed data from the source environment and writing it to a database included in the target shard within the target environment identified in the piece of route information for the target entity.

* * * * *